United States Patent [19]

Müller et al.

[11] Patent Number: 6,075,064
[45] Date of Patent: Jun. 13, 2000

[54] RIGID HYDROPHOBIC POLYURETHANES

[75] Inventors: Hanns-Peter Müller, Odenthal; Kirkor Sirinyan; Manfred Kapps, both of Bergisch Gladbach, all of Germany

[73] Assignee: Bayer Aktiengesellschaft, Leverkusen, Germany

[21] Appl. No.: 08/235,608

[22] Filed: Apr. 29, 1994

[30] Foreign Application Priority Data

May 12, 1993 [DE] Germany ............................ 43 15 841

[51] Int. Cl.$^7$ .................................................. C08G 18/00
[52] U.S. Cl. ......................... 521/174; 521/155; 521/179; 528/48; 528/49; 528/76; 528/80; 528/274
[58] Field of Search .................................. 521/174, 155, 521/179; 528/48, 49, 76, 80, 274

[56] References Cited

U.S. PATENT DOCUMENTS

| | | | |
|---|---|---|---|
| 3,248,349 | 4/1966 | Szabat et al. | 260/2.5 |
| 3,432,451 | 3/1969 | Kales | 260/23 |
| 3,558,531 | 1/1971 | Salyer et al. | 260/2.5 |
| 4,758,605 | 7/1988 | Williams | 521/129 |
| 5,079,270 | 1/1992 | Burkhart et al. | 521/117 |

FOREIGN PATENT DOCUMENTS 2176928  3/1973  Germany .
3530754  3/1987  Germany .

OTHER PUBLICATIONS

G. Heilig Kunststoffe, 81 p. 622 (1991)—English translation attached.

V. Gajewski, Proceeding of the SPI–33rd Annual Technical/Marketing Conference, p. 506, Technomic Publishing Co., Inc., Pennsylvania (1990).

*Primary Examiner*—Duc Truong
*Attorney, Agent, or Firm*—Joseph C. Gil; Lyndanne M. Whalen

[57] ABSTRACT

Rigid polyurethanes are obtained by reacting (1) a polyisocyanate with (2) a polyol mixture made up of (a) an OH-functional polyester based on a $C_{9-22}$ fatty acid with a molecular weight of from about 260 to about 2,000, (b) a non-functional oligomeric polyolefin with a molecular weight of from about 700 to about 6,000 and optionally (c) an at least difunctional polyol and/or polyamine with a molecular weight of from about 62 to about 8,000 (preferably from about 62 to about 400) which is different from (a), optionally in the presence of (3) a blowing agent such as water and (4) an auxiliary agent and/or additive of the type typically used in polyurethane chemistry.

13 Claims, No Drawings

RIGID HYDROPHOBIC POLYURETHANES

BACKGROUND OF THE INVENTION

This invention relates to new hydrophobic rigid polyurethanes, particularly rigid polyurethane foams.

Materials based on polyurethanes are well known. See, for example, G. Oertel, "Polyurethane", Kunststoff-Handbuch, Georg Thieme Verlag, Stuttgart/New York (1987). Cast polyurethane (hereinafter referred to as "PUR") resins, flexible PUR foams and rigid PUR foams are also well known. PUR foams are crosslinked polyurethanes. Rigid foams are mostly closed-cell materials. Flexible foams are mainly open-cell materials.

In general, rigid foams are produced by the addition of a liquid low-boiling blowing agent. The most commonly used blowing agent has been fluorotrichloromethane. (See, G. Oertel, "Polyurethane", Kunststoff-Handbuch, Georg Thieme Verlag, Stuttgart/New York (1987)). However, fluorocarbons are now regarded as environmental pollutants.

For this reason, attempts are being made to replace this class of compounds with low-boiling hydrocarbons such as n-pentane or n-hexane (See,. G. Heilig, Kunststoffe, 81, page 622 (1991)). It is well known that low-boiling hydrocarbons are highly flammable liquids. Consequently, work with low-boiling hydrocarbons often involves additional and expensive safety measures to protect against explosions.

PUR matrices are, to a certain extent, hydrophilic systems. According to the literature, —NH—CO—O— and —NH—CO—NH— bonds enter into a relatively strong physical interaction with the water molecules, thus enabling water to diffuse into the PUR matrix (See, for example, V. Gajewski, Proceedings of the SPI-33rd Annual Technical/Marketing Conference, page 506, Technomic Publishing Co., Inc., Pennsylvania (1990)).

The generally undesirable diffusion of water into the PUR matrix can lead to a) reduction in hydrolytic stability, b) deterioration in the thermal and electrical insulation properties, c) deterioration in the mechanical properties, particularly dimensional stability and shrinkage behavior, and d) increased permeability to gases (e.g., $CO_2$ and $O_2$).

SUMMARY OF THE INVENTION

The problem addressed by the present invention is the provision of hydrophobic rigid polyurethanes and, in particular, rigid PUR foams which are distinguished by the absence of shrinkage, by dimensional stability, by hydrolytic stability, by excellent long-term behavior and by very good insulation properties. Such rigid PUR foams should be obtained using water as the blowing agent, have closed cells and show the advantages mentioned above.

Surprisingly, this problem has been solved by the reaction of polyisocyanates with a polyol mixture made up of specific polyols to form polyurethanes. The polyol mixture includes: a) special OH-functional polyesters based on fatty acids, b) non-functional oligomeric polyolefins and optionally, c) polyols which are different from a) and/or polyamines.

It was extremely surprising to find that highly hydrophobic polyurethanes are obtained by the use of the polyol mixtures of the present invention despite the fact that their matrices are further characterized by the formation of polar —NH—CO—O— and —NH—CO—NH— bonds.

DETAILED DESCRIPTION OF THE PRESENT INVENTION

The present invention relates to rigid polyurethanes produced by reacting (1) a polyisocyanate with (2) a polyol mixture that includes: (a) an OH-functional polyester having a molecular weight of from about 260 to about 2,000 which is based on $C_{9-22}$ fatty acids; (b) a non-functional oligomeric polyolefin with a molecular weight of from about 700 to about 6,000; and optionally (c) an at least difunctional polyol and/or polyamine with a molecular weight of from about 62 to about 8,000 and preferably with a molecular weight of from about 62 to about 400 which difunctional polyol is different from component (2)(a), optionally in the presence of (3) a physical or chemical blowing agent (preferably water), and (4) any of the known auxiliaries and additives.

In a preferred embodiment of the invention, component (2)(b) is a non-functional polyisobutene or polypropylene, a non-functional polybutadiene, a non-functional polyisoprene, or a non-functional polybutylene and component (2)(a) is an OH-functional triglyceride of a natural fatty acid or a sorbitan ester.

It is preferred that component (2)(a) be present in polyol mixture (2) in a quantity of from about 1 to about 80% by weight; component (2)(b) be present in polyol mixture (2) in a quantity of from about 5 to about 80% by weight; and component (2)(c) be present in polyol mixture (2) in a quantity of from 0 to about 80% by weight, with the sum of components (2)(a), (2)(b) and (2)(c) being 100% by weight.

Rigid hydrophobic polyurethane foams are preferred polyurethanes within the scope of the present invention.

The present invention also relates to the use of rigid hydrophobic polyurethane foams produced by the above-described process as insulation materials in the refrigeration, building, automotive, shipbuilding and/or electronics fields.

Suitable starting materials for the rigid hydrophobic polyurethanes include: aliphatic, cycloaliphatic, araliphatic, aromatic and heterocyclic polyisocyanates of the type described, for example, by W. Siefken in Justus Liebigs Annalen der Chemie, 562, pages 75 to 136, such as those corresponding to the formula:

in which n represents a number of from 2 to 4, preferably 2 or 3, and

Q represents an aliphatic hydrocarbon radical containing from 2 to 18 (preferably 6 to 10) carbon atoms, a cycloaliphatic hydrocarbon radical containing from 4 to 15 (preferably 5 to 10) carbon atoms, an aromatic hydrocarbon radical containing from 6 to 15 (preferably 6 to 13) carbon atoms or an araliphatic hydrocarbon radical containing 8 to 15 (preferably 8 to 13) carbon atoms.

Specific examples of these polyisocyanates are given in DE–OS 28 32 253, pages 10–11. In general, those polyisocyanates which are commercially available such as 2,4- and 2,6-toluene diisocyanate and mixtures of these isomers ("TDI"); polyphenyl/polymethylene polyisocyanates of the type obtained by phosgenation of aniline/formaldehyde condensates ("crude MDI") and polyisocyanates containing carbodiimide groups, urethane groups, allophanate groups, isocyanurate groups, urea groups or biuret groups ("modified polyisocyanates"), particularly modified polyisocyanates derived from 2,4- and/or 2,6-toluene diisocyanate and from 4,4'- and/or 2,4'-diphenyl methane diisocyanate are preferred.

The polyol mixture used in the practice of the present invention includes as component (2)(a), at least one OH-functional polyester based on $C_{9-22}$ fatty acids having a molecular weight of from about 260 to about 2,000. These OH-functional polyesters are known materials. Polyesters based on renewable raw materials are particularly preferred. "Renewable raw materials" are defined, for example, in "Nachwachsender Rohstoffe und ihre Verwendung", AIO (Auswertungs- und Informationsdienst für Ernährung, Landwirtschaft und Forsten (AIO) 5300 Bonn (1992)). Examples of polyesters based upon renewable raw materials include sorbitan esters of aliphatic long-chain organic acids and polyesters of monohydric or polyhydric alcohols and dodecanoic, lauric, hexadecanoic and palmitic acid and polyesters of mono- or polyunsaturated $C_{9-22}$ fatty acids. Polyesters based on OH-functional triglycerides of natural fatty acids and sorbitan esters are most preferred.

It is known that triglycerides of unsaturated fatty acids can be epoxidized by the in situ performic acid process and can be provided with OH groups by subsequent reaction with alcohols or acids (See, e.g., B. Gruber et al., Fett Wissenschaft Technologie, 89, 147 (1987) and R. Höfe, Ph äomen Farbe, 4, page 55 (1992)).

OH-functional triglycerides of 9-hexadecenoic acid (palmitic acid), 9-octadecenoic acid (oleic acid), 9,12-octadecadienoic acid (linoleic acid), 9,12,15-octadecatrienoic acid (linolenic acid), 9,11,13-octadecatrienoic acid (wood oil) and 12-hydroxy-9-octadecenoic acid (ricinoleic acid) and mixtures thereof are preferably used in accordance with the invention. These OH-functional triglycerides are generally present in the polyol mixture in a quantity of from about 1 to about 80% by weight, based on the total weight of the polyol mixture. The OH value (See, e.g., H. Kittel, Farben-, Lack- und Kunststoff-Lexikon, (Wiss. Verlagsgesellschaft M.B.H. Stuttgart (1952)) of these polyesters is generally in the range of from about 50 to about 600.

Mixtures of OH-functional polyesters based on $C_{9-22}$ fatty acids may, of course, also be used.

The polyol mixture of the present invention also includes (as component (2)(b)) oligomeric polyolefins with a molecular weight of 700 to 6,000 which are free from functional groups capable of reacting with an isocyanate, for example OH, COOH or $NH_2$ groups.

Suitable oligomeric polyolefins are known materials. These polyolefins include those based on isobutene, butadiene, isoprene and propylene. Oligomeric polyolefins based on isobutene and propylene or mixtures thereof are preferably used to produce hydrophobic rigid PUR foams. Oligomeric polyolefins used to produce PUR foams in accordance with the present invention have molecular weights in the range of from about 700 to about 6,000.

The polyol mixture used in the practice of the present invention also includes (as component (2)(c)) at least difunctional polyols with a molecular weight of 62 to 8,000 which are different from the OH-functional polyesters based on $C_{9-22}$ fatty acids which are useful as the first component (i.e., component (2)(a)) of the polyol mixture. These at least difunctional polyols are preferably polyether polyols or low molecular weight polyols having a molecular weight of from about 62 to about 400 (e.g., glycerol, trimethylol propane or butanediol); and alkylene oxide adducts of relatively high functionality. Alkylene oxide adducts based on natural materials, such as sorbitol, sucrose, glucose and glycerol are particularly preferred (See, for example, U.S. Pat. No. 2,990,376, and German Offenlegungsschriften 2,639,083; 2,639,084; 2,714,084; 2,714,104; 2,721,186; 2,721,093; 2,732,077; 2,738,154; 2,738,512; 2,756,270; 2,808,228 and 2,831,659).

Propylene oxide and/or ethylene oxide are particularly suitable epoxides for the synthesis of polyether polyols. Propylene oxide yields secondary OH groups in the alkali-catalyzed polyaddition reaction. Ethylene oxide yields primary OH groups which are more reactive to isocyanate groups. The activity behavior of the polyether can therefore be determined in advance through the type of epoxide used. Through the step-by-step polyaddition of propylene and ethylene oxide, segments of one epoxide or the other can be selectively incorporated in the chains at predetermined positions. Accordingly, properties of the polyol (in addition to activity), such as viscosity, hydrophilicity and compatibility with the OH-functional polyesters mentioned (component (2)(a)) and oligomeric polyolefins (component (2)(b)) may be controlled as required.

The at least difunctional polyol (2)(c) may be present in the polyol mixture in an amount of from 0 to about 80% by weight (based on the polyol mixture as a whole).

The OH groups of polyol (2)(c) and/or polyamine may be present in the polyol placed by amino groups. It is known that aliphatic amines (e.g., ethylenediamine) and aromatic amines (e.g., diaminotoluene or diaminodiphenyl methane), are useful as starters in the production of polyethers. Aminoalcohols may also be used for this purpose. By virtue of their high activity, nitrogen-containing polyols such as these are often used in rigid foam formulations (see G. Oertel, "Polyurethane", Kunststoff-Handbuch, page 18, Georg Thieme Verlag, Stuttgart/New York (1987)).

Any of the known blowing agents may be used to produce foams in accordance with the present invention. Suitable blowing agents include low-boiling, halogenated or even halogen-free hydrocarbons. Fluorotrichloromethane, hexafluoroethane, n-pentane, butane, cyclopentane, n-hexane, cleaner's naphtha, mixtures thereof with one another and emulsions or dispersions thereof with water are specific examples of suitable blowing agents (see G. Heilig, Kunststoffe, 81, page 622 (1991)). Water is preferably used as the blowing agent.

Auxiliary agents and additives may optionally be used in the practice of the present invention. Examples of suitable auxiliary agents and additives include: a) other readily volatile organic compounds as additional blowing agents; b) known catalysts which may be used in quantities of up to 10% by weight, based on the quantity of total polyol component (2); c) surface-active additives such as emulsifiers and foam stabilizers; and d) reaction retarders (e.g., substances showing an acidic reaction, such as hydrochloric acid or organic acid halides), known cell regulators known (e.g., paraffins or fatty alcohols or dimethyl polysiloxanes), pigments, dyes, known flameproofing agents (e.g., tricresyl phosphate), stabilizers against the effects of ageing and weathering, plasticizers, fungistatic and bacteriostatic agents and fillers (e.g., barium sulfate, kieselguhr, carbon black or whiting). These and other suitable auxiliary agents and additives are described, for example, in German Offenlegungsschriften 27 32 292 at pages 21–24.

Additional examples of suitable surface-active additives and foam stabilizers, cell regulators, reaction retarders, stabilizers, flameproofing agents, plasticizers, dyes and fillers, fungistatic and bacteriostatic agents which may optionally be used in the practice of the present invention and information on the use of such auxiliary agents and additives and on their modes of action can be found in Kunststoff-Handbuch, Vol. VII, edited by Vieweg und H öchtlen, Carl-Hanser-Verlag München 1966 (e.g., pages 103 to 113).

The rigid PUR foams of the present invention may be produced by any of the known methods. Examples of processes for the production of polyurethanes in accordance with the present invention include those in which the reaction components are reacted by the known one-shot process, prepolymer process or semiprepolymer process. Machines such as those described in U.S. Pat. No. 2,764,565 may be used to carry out these processes. Examples of other processing machines which may also be used in accordance with the invention are described in Kunststoff-Handbuch, Vol. VII, edited by Vieweg und Höchtlen, Carl-Hanser-Verlag München 1966 at pages 121 to 205.

The foams of the present invention may be produced by the known block foaming or laminator processes.

Hydrophobic rigid PUR foams are those foams which, after preparation (see the Examples), have a water absorption in a 100% water<3.5%, preferably <3.25% and more preferably <2.9%.

The rigid PUR foams produced in accordance with the present invention typically have a density of from about 25 to about 85 kg/m$^3$. However, in specific applications, foams having higher or lower densities may be desirable and may be produced in accordance with the present invention.

The polyol mixtures used in the practice of the present invention are eminently suitable for the production of water-blown, shrinkage-free, closed-cell rigid PUR foams which are relatively impermeable to $CO_2$ and $O_2$.

The rigid hydrophobic open-cell or, more particularly, closed-cell PUR foams of the present invention may be used in civil engineering and building construction and in the automotive, packaging, domestic appliance, shipbuilding, electrical and refrigeration fields. They are also eminently suitable for the production of insulation boards, integral PUR foams and sandwich elements. They may also be used for lining interiors and for filling cavities.

Polyurethanes produced in accordance with the present invention may also be produced by known casting processes (optionally under pressure) and also by known RIM and RRIM technology. Subsequent thermoforming is also possible with the polyurethanes of the present invention.

The present invention is illustrated by the following examples in which all parts and percentages are parts by weight and percentages by weight, unless otherwise indicated.

EXAMPLES

Example 1

The following materials were mixed with vigorous stirring at room temperature:
40.0 parts by weight of the oligomeric polyisobutene Oppanol B3 (a commercial product of BASF AG) having a molecular weight of 800–1,000 g/mol,
40.0 parts by weight of an oleochemical polyol based on glycerol (Sovermole® Pol/l; a product of Henkel KGaA),
11.7 parts by weight of glycerol,
5.0 parts by weight of water,
1.3 parts by weight of the silicone stabilizer designated 1836 (a product of Bayer AG),
3.0 parts by weight of dimethylbenzyl amine, and
170.0 parts by weight of the crude MDI available under the name Desmodur® 44 V 20 (a product of Bayer AG).

The liquid, but not yet visibly foaming mixture was then introduced into a paper box measuring 25×13×13 cm and foamed with spontaneous heating.

The PUR mixture had a rise time of approx. 150 seconds. After another 240 seconds, the foam has developed adequate strength and could be handled without difficulty. The rigid foam formed had a slab height of approx. 21 cm and a density of 44 kg/m$^3$.

The product foam was highly hydrophobic, dimensionally stable and free from shrinkage after storage for several weeks. Its water absorption (determined gravimetrically) was around 2.4%.

Comparison Example 1a

The following materials were mixed with vigorous stirring at room temperature:
48.0 parts by weight of the same oligomeric polyisobutene used in Example 1,
48.0 parts by weight of Desmophen® 4012, a polyol based on trimethylol propane and propylene oxide having an OH value of 380 (a product of Bayer AG),
14.4 parts by weight of glycerol,
6.0 parts by weight of water,
3.6 parts by weight of the catalyst which is commercially available under the name Desmorapid® DB from Bayer AG, and
1.5 parts by weight of the silicone stabilizer used in Example 1.

A highly viscous polyol mixture was obtained. This mixture was not miscible with the polyisocyanate component (Desmodur® 44 V 20) and could not be processed to produce a rigid PUR foam.

Comparison Example 1b

The following materials were mixed with vigorous stirring at room temperature:
100.0 parts by weight of Desmophen® 4012, a polyether polyol of trimethylol propane and propylene oxide (a product of Bayer AG) having an OH value of 380,
6.0 parts by weight of water,
3.6 parts by weight of the catalyst which is commercially available under the name Desmorapid® DB from Bayer AG,
1.6 parts by weight of the silicone stabilizer used in Example 1 and
97.8 parts by weight of Desmodur® 44 V 20 crude MDI.

A closed-cell rigid PUR foam with a rise time of 60 seconds and a slab height of approx. 21 cm was obtained. It had a density of 41 kg/m$^3$. It was relatively hydrophilic and had a water absorption of 4.2%.

Comparison Example 1c

The following materials were mixed with vigorous stirring at room temperature:
40.0 parts by weight of the oligomeric polyolefin (a mixture of $C_{20}$ isoparaffins with at most 10% $C_{16}$ isoparaffins based on isobutene having a molecular weight of approx. 280–300 g/mol) of IEC (isoeicosane) which is a commercial product of EC Erdölchemie GmbH,
40.0 parts by weight of the oleochemical polyol based on glycerol (Sovermol Pol/l) used in Example 1,
11.7 parts by weight of glycerol,
5.0 parts by weight of water,
1.3 parts by weight of the silicone stabilizer used in Example 1,
3.0 parts by weight of dimethylbenzyl amine, and
170.0 parts by weight of Desmodur® 44 V 20, a crude MDI (Bayer AG).

A homogeneous PUR mixture was obtained. This mixture could not be processed to form a rigid PUR foam. It collapsed in 120 seconds to form a relatively compact brittle material of medium porosity. It had a slab height of approx. 1.5 cm.

Example 2

The following materials were mixed with vigorous stirring at room temperature:

40.0 parts by weight of the oligomeric polyisobutene used in Example 1,
28.6 parts by weight of an oleochemical polyol based on lauric acid sorbitan ester having an OH value of 350,
11.7 parts by weight of glycerol,
5.0 parts by weight of water,
1.3 parts by weight of the silicone stabilizer used in Example 1,
3.0 parts by weight of dimethylbenzyl amine,
170.0 parts by weight of Desmodur® 44 V 20, a crude MDI (Bayer AG)

The liquid, not yet visibly foaming mixture was then poured into a paper box measuring 25×13×13 cm and foamed with spontaneous heating.

The PUR mixture had a rise time of approximately 160 seconds. After another 250 seconds, the foam developed adequate strength.

The rigid foam formed had a slab height of approx. 21 cm and a density of ~44 kg/m$^3$. It was hydrophobic, dimensionally stable and free from shrinkage after storage for several weeks. It had a water absorption of approximately 2.5%. The water absorption of the sample was gravimetrically determined.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A rigid, hydrophobic polyurethane foam which is the reaction product of
   (1) a polyisocyanate with
   (2) a polyol mixture made up of
      (a) at least one OH-functional polyester based on a $C_{9-22}$ fatty acid having a molecular weight of from about 260 to about 2,000,
      (b) at least one non-functional oligomeric polyolefin having a molecular weight of from about 700 to about 6,000 and optionally
      (c) at least one polyol and/or polyamine having a functionality of at least two and a molecular weight of from about 62 to about 8,000 which is different from (2)(a), in the presence of
   (3) a blowing agent, and optionally
   (4) an auxiliary agent or additive.

2. The polyurethane of claim 1 in which (2)(c) is present.
3. The polyurethane of claim 2 in which (2)(c) has a molecular weight of from about 62 to about 400.
4. The polyurethane of claim 1 in which water is used as blowing agent (3).
5. The polyurethane of claim 1 in which (2)(b) is a non-functional polyisobutene or polypropylene.
6. The polyurethane of claim 1 in which (2)(b) is an oligomeric polyolefin with a molecular weight of from about 700 to about 6,000.
7. The polyurethane of claim 1 in which component (2)(b) is a non-functional polyisoprene, polybutylene or polybutadiene.
8. The polyurethane of claim 1 in which (2)(a) is an OH-functional triglyceride of a natural fatty acid or sorbitan ester.
9. The polyurethane of claim 1 in which (2)(a) is present in the polyol mixture (2) in a quantity of from about 1 to about 80% by weight, the sum of components (2)(a), (2)(b) and (2)(c) being 100% by weight.
10. The polyurethane of claim 1 in (2)(b) is present in the polyol mixture (2) in a quantity of from about 5 to about 80% by weight, the sum of components of (2)(a), (2)(b) and (2)(c) being 100% by weight.
11. The polyurethane of claim 1 in which (2)(c) is present in polyol mixture (2) in a quantity of from 0 to about 80% by weight, the sum of components (2)(a), (2)(b) and (2)(c) being 100% by weight.
12. The polyurethane of claim 1 in which blowing agent (3) is included in the materials used to produce that polyurethane.
13. A process for the production of rigid hydrophobic polyurethane foams useful as insulation materials comprising reacting
   (1) a polyisocyanate with
   (2) a polyol mixture made up of
      (a) an OH-functional polyester based on a $C_{9-22}$ fatty acid having a molecular weight of from about 260 to about 2,000,
      (b) a non-functional oligomeric polyolefin having a molecular weight of from about 700 to about 6000, and optionally,
      (c) an at least difunctional polyol which is different from (a) and/or polyamine having a molecular weight of from about 62 to about 8,000
   in the presence of
   (3) a blowing agent.

* * * * *